United States Patent
Chung et al.

(10) Patent No.: US 9,196,421 B2
(45) Date of Patent: *Nov. 24, 2015

(54) MULTILAYER CERAMIC ELECTRONIC COMPONENT

(71) Applicant: SAMSUNG ELECTRO-MECHANICS CO., LTD., Suwon, Gyunggi-do (KR)

(72) Inventors: Hae Sock Chung, Gyunggi-do (KR); Byoung Hwa Lee, Gyunggi-do (KR); Min Cheol Park, Gyunggi-do (KR); Eun Hyuk Chae, Gyunggi-do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/505,239

(22) Filed: Oct. 2, 2014

(65) Prior Publication Data

US 2015/0016020 A1    Jan. 15, 2015

Related U.S. Application Data

(63) Continuation of application No. 13/729,911, filed on Dec. 28, 2012, now Pat. No. 8,902,563.

(30) Foreign Application Priority Data

Apr. 26, 2012 (KR) .................. 10-2012-0043976

(51) Int. Cl.
*H01G 4/005* (2006.01)
*H01G 4/30* (2006.01)
(Continued)

(52) U.S. Cl.
CPC ............. *H01G 4/005* (2013.01); *H01G 4/012* (2013.01); *H01G 4/12* (2013.01); *H01G 4/248* (2013.01); *H01G 4/30* (2013.01); *H01G 4/232* (2013.01)

(58) Field of Classification Search
USPC .............................. 361/303, 301.4, 328–329
See application file for complete search history.

(56) References Cited

U.S. PATENT DOCUMENTS

| 5,583,738 A | 12/1996 | Kohno et al. |
| 5,880,925 A | 3/1999 | DuPre et al. |

(Continued)

FOREIGN PATENT DOCUMENTS

| JP | 64-46912 A | 2/1989 |
| JP | 11-026291 A | 1/1999 |

(Continued)

OTHER PUBLICATIONS

Non-Final Office Action U.S. Appl. No. 13/729,911 dated Apr. 11, 2014.

(Continued)

*Primary Examiner* — Eric Thomas
(74) *Attorney, Agent, or Firm* — McDermott Will & Emery LLP

(57) ABSTRACT

There is provided a multilayer ceramic electronic component, including: a ceramic body formed by laminating dielectric layers having an average thickness of 0.7 μm or less; external electrodes formed on external surfaces of the ceramic body; and internal electrodes respectively disposed on the dielectric layer so as to have a gap formed therebetween, wherein, when a narrowest gap between the internal electrode edges adjacent to one another is denoted by Gmin, 10 μm≤Gmin≤60 μm is satisfied.

11 Claims, 6 Drawing Sheets

(51) Int. Cl.
*H01G 4/012* (2006.01)
*H01G 4/12* (2006.01)
*H01G 4/248* (2006.01)
*H01G 4/232* (2006.01)

(56) References Cited

U.S. PATENT DOCUMENTS 7,251,119 B2 7/2007 Kim et al.
8,902,563 B2 * 12/2014 Chung et al. .................. 361/303
2007/0211405 A1 9/2007 Togashi
2009/0290280 A1 11/2009 Takeuchi et al.
2011/0032655 A1 * 2/2011 Togashi .................... 361/301.4

FOREIGN PATENT DOCUMENTS

JP 2002-299148 A 10/2002
KR 2005-0089493 A 9/2005

OTHER PUBLICATIONS

Notice of Allowance U.S. Appl. No. 13/729,911 dated Jul. 30, 2014.

* cited by examiner

II-II'

III-III'

MULTILAYER CERAMIC ELECTRONIC COMPONENT

CROSS-REFERENCE TO RELATED APPLICATIONS

This application is a Continuation Application of U.S. Ser. No. 13/729,911 filed Dec. 28, 2012 which claims priority from Korean Patent Application No. 10-2012-0043976 filed on Apr. 26, 2012. The subject matter of each is incorporated herein by reference in entirety.

BACKGROUND OF THE INVENTION

1. Field of the Invention

The present invention relates to a multilayer ceramic electronic component.

2. Description of the Related Art

In a multilayer ceramic capacitor, a multilayer ceramic electronic component, internal electrodes are formed between a plurality of dielectric layers.

As electronic products are increasingly being miniaturized and multi-functionalized, chip type multilayer capacitors embedded in electronic products are also increasingly being required to be miniaturized and have high capacitances.

The tendency for the miniaturization and implementation of high capacitance in multilayer capacitors is also apparent in array-type multilayer ceramic capacitors. In an array-type multilayer ceramic capacitor, a gap is formed between adjacent internal electrodes printed on individual dielectric layers, and electrical concentration has been prevented by curvedly forming edge portions adjacent to one another at the gap.

As for the upper and lower internal electrodes disposed between the dielectric layers in the array-type multilayer ceramic capacitor, an electric field is concentrated on the internal electrode edges of the internal electrode patterns, at a point which the upper and lower internal electrodes start to overlap one another, and thus, breakdown voltage (BDV) characteristics thereof may be deteriorated.

In an array-type multilayer ceramic capacitor in which the number of laminations is increased and dielectric layer thickness is decreased in order to implement miniaturization and high capacitance, interference between the upper and lower internal electrodes may worsen, and thus, there is a need for studies into the improvement of BDV characteristics by further specifying the relationship between the gap formed between adjacent internal electrodes and the curvatures of internal electrode edges of internal electrodes facing one another.

Related art document 1 below does not disclose the array-type multilayer capacitor; Related art document 2 discloses an internal electrode pattern that is inappropriate in terms of capacitance formation; and Related art document 3 discloses the curved shape of an internal electrode, but does not disclose the distance of a gap between internal electrodes.

RELATED ART DOCUMENTS (Document 1) Japanese Patent Laid-Open Publication No. 2002-299148

(Document 2) Japanese Patent Laid-Open Publication No. 1999-026291

(Document 3) Korean Patent Laid-Open Publication No. 2005-0089493

SUMMARY OF THE INVENTION

An aspect of the present invention provides an array-type multilayer ceramic electronic component in which the size of a gap is controlled by curvedly forming internal electrode edges of internal electrodes provided adjacent to one another on an individual dielectric layer, with the gap therebetween, in order to improve BDV characteristics.

According to an aspect of the present invention, there is provided a multilayer ceramic electronic component, including: a ceramic body formed by laminating dielectric layers having an average thickness of 0.7 μm or less; at least two external electrodes formed on external surfaces of the ceramic body; and internal electrodes printed on the dielectric layers so as to be printed on a single dielectric layer and thus have a gap formed therebetween, the internal electrodes constituting at least two internal electrode lamination portions, wherein the gap between the internal electrode of one internal electrode lamination portion and the internal electrode of the other internal electrode lamination portion adjacent to the one internal electrode lamination portion is defined by internal electrode edges with curves, adjacent to one another; when a narrowest gap between the internal electrode edges adjacent to one another is denoted by Gmin, 10 μm≤Gmin≤60 μm is satisfied, and when a width of a central portion of the internal electrode is denoted by Wa; and a width of an end portion of an outline of the internal electrode is denoted by Wb, 1.1≤Wa/Wb≤1.35 is satisfied.

Here, when a margin portion between the internal electrode edge of the internal electrodes and one end surface of the ceramic body adjacent thereto is denoted by Ms, Gmin≤Ms may be satisfied.

Here, Wa may be a widest width of the internal electrode and Wb may be a narrowest width of the internal electrode.

Here, in at least one of the internal electrode lamination portions, between the internal electrodes having the dielectric layer therebetween and facing one another in a lamination direction thereof, one internal electrode may include a lead drawn out to one side surface of the ceramic body and the other internal electrode may include a lead drawn out to the other side surface of the ceramic body.

The ceramic body may have a length and a width of 0.9±0.15 mm and 0.6±0.15 mm, or 1.37±0.15 mm and 1.0±0.15 mm, respectively.

The internal electrodes having the dielectric layer therebetween and facing one another in a lamination direction thereof may have corner portions which do not overlap one another.

The outline of the internal electrode may be more convex toward the central portion of the internal electrode.

According to another aspect of the present invention, there is provided a multilayer ceramic electronic component, including: a ceramic body including dielectric layers having an average thickness of 0.7 μm or less; external electrodes formed on external surfaces of the ceramic body; and internal electrodes adjacent to one another with a gap therebetween on a single dielectric layer, wherein, when a narrowest gap between internal electrode edges of the internal electrodes adjacent to one another is denoted by Gmin, 10 μm≤Gmin≤60 μm is satisfied.

The internal electrode edges of the internal electrodes may be formed such that the gap is narrower toward a central portion of the internal electrode in a width direction thereof.

Here, when a width of the central portion of the internal electrode is denoted by Wa, and a width of an end portion of an outline of the internal electrode is denoted by Wb, 1.1≤Wa/Wb≤1.35 may be satisfied.

Here, Wa may be a widest width of the internal electrode and Wb may be a narrowest width of the internal electrode.

Here, when a margin portion between the internal electrode edges of the internal electrodes and one end surface of the ceramic body adjacent thereto is denoted by Ms, Gmin≤Ms may be satisfied.

Here, between the internal electrodes having the dielectric layer therebetween and facing one another in a lamination direction thereof, one internal electrode may include a lead drawn out to one side surface of the ceramic body and the other internal electrode may include a lead drawn out to the other side surface of the ceramic body.

The ceramic body may have a length and a width of 1.37±0.15 mm and 1.0±0.15 mm, or 0.9±0.15 mm and 0.6±0.15 mm, respectively.

The internal electrodes having the dielectric layer therebetween and adjacent to one another in a lamination direction thereof may have corner portions which do not overlap one another.

According to another aspect of the present invention, there is provided a multilayer ceramic electronic component, including: a 1410-sized or smaller ceramic body including dielectric layers having an average thickness of 0.7 μm or less; at least two external electrodes formed on one side surface of the ceramic body; and internal electrodes disposed on the dielectric layers so as to have a gap therebetween and be adjacent to one another, the internal electrodes being laminated in an amount of 200 layers or more to thereby constitute first and second internal electrode lamination portions, wherein, on a single dielectric layer, the internal electrode of the first internal electrode lamination portion and the internal electrode of the second internal electrode lamination portion include internal electrode edges adjacent to one another, the internal electrode edges of the internal electrodes having a curvature thereof; when a narrowest gap between the internal electrode edges adjacent to one another is denoted by Gmin, 10 μm≤Gmin≤60 μm is satisfied; and when a width of a central portion of the internal electrode is denoted by Wa, a width of an end portion of an outline of the internal electrode is denoted by Wb, and the curvature of the internal electrode edge is denoted by Wa/Wb, 1.1≤Wa/Wb≤1.35 is satisfied.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
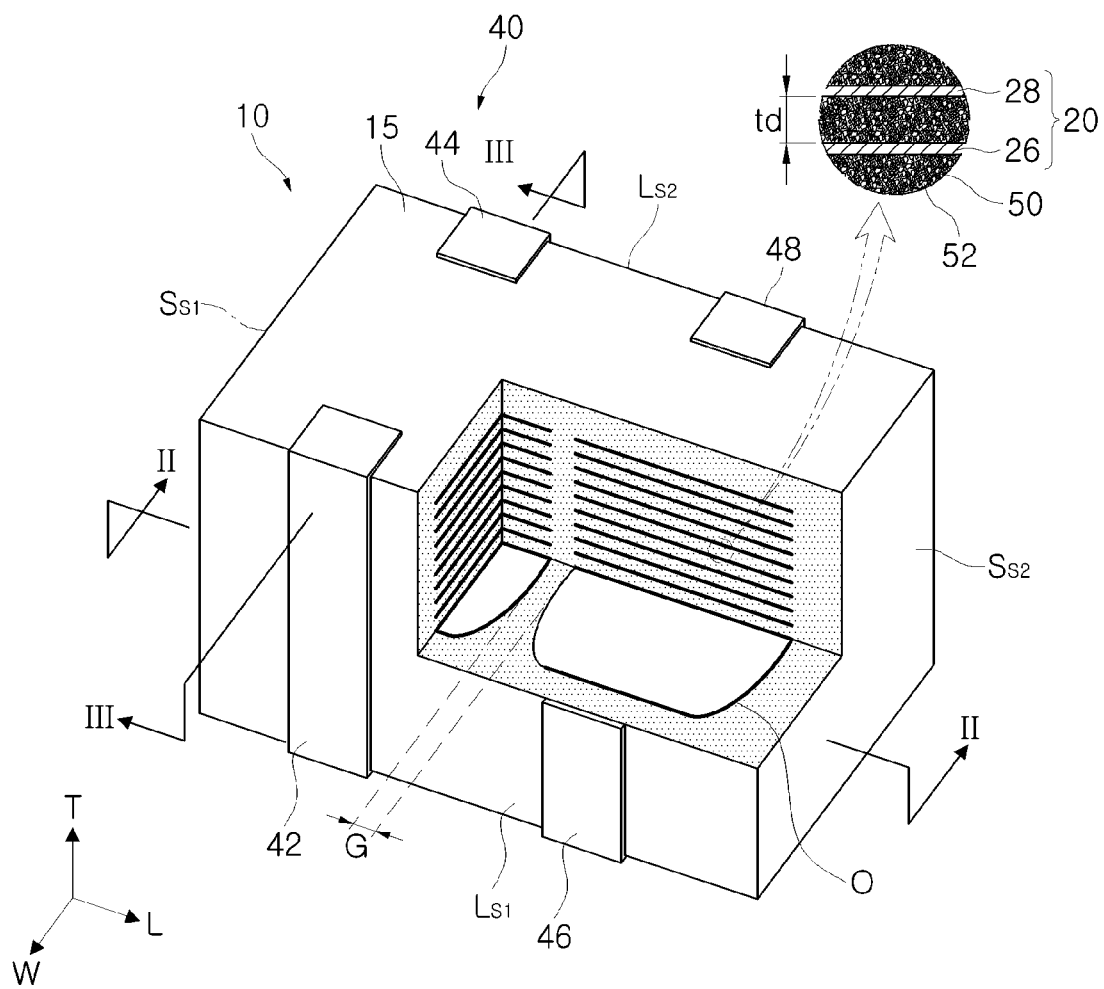
FIG. 1 is a partially cut-away perspective view of an array-type multilayer ceramic capacitor according to an embodiment of the present invention.

Embodiments of the present invention will now be described in detail with reference to the accompanying drawings. However, it should be noted that the spirit of the present invention is not limited to the embodiments set forth herein and that those skilled in the art and understanding the present invention may easily accomplish retrogressive inventions or other embodiments included in the spirit of the present invention by the addition, modification, and removal of components within the same spirit, but those are construed as being included in the spirit of the present invention.

Further, like reference numerals will be used to designate like components having similar functions throughout the drawings within the scope of the present invention.

A multilayer ceramic electronic component according to an embodiment of the present invention may be appropriately used in a multilayer ceramic capacitor, a multilayer varistor, a thermistor, a piezoelectric element, a multilayer substrate, or the like, that have a structure in which dielectric layers corresponding to ceramic layers are used and internal electrodes face one another with the dielectric layer therebetween.

Hereinafter, an array-type multilayer ceramic capacitor according to an embodiment of the present invention will be described.

Array-type Multilayer Ceramic Capacitor

Figure 2:
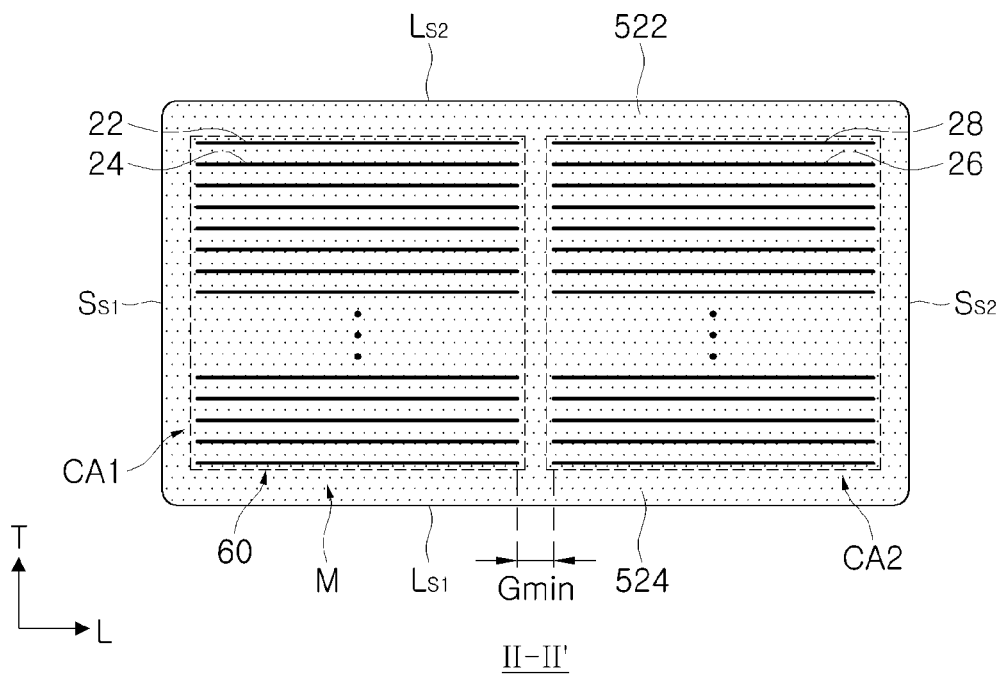
FIG. 2 is a schematic cross-sectional view taken along line II-II of FIG. 1.
Figure 3:
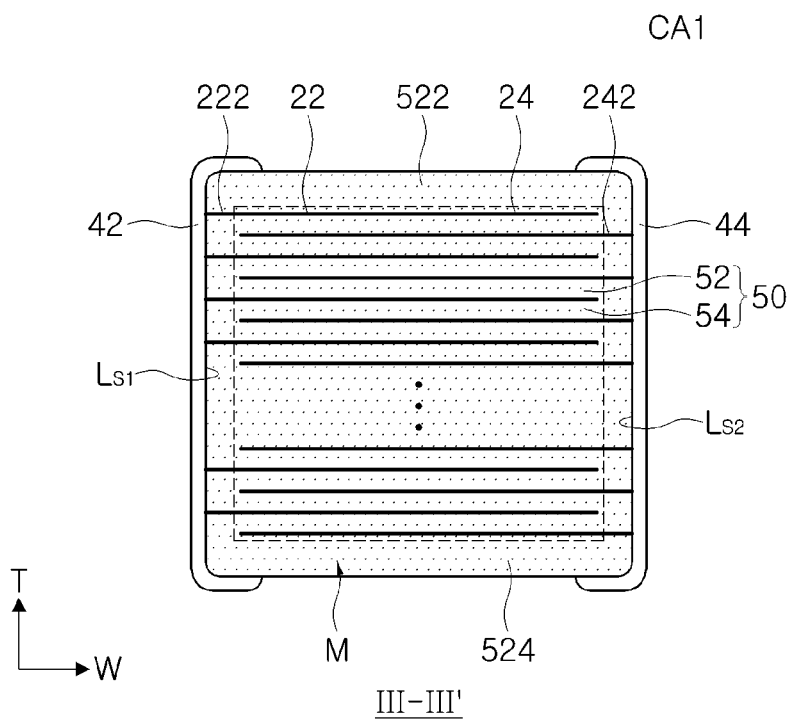
FIG. 3 is a schematic cross-sectional view taken along line III-III of FIG. 1.
Figure 4:
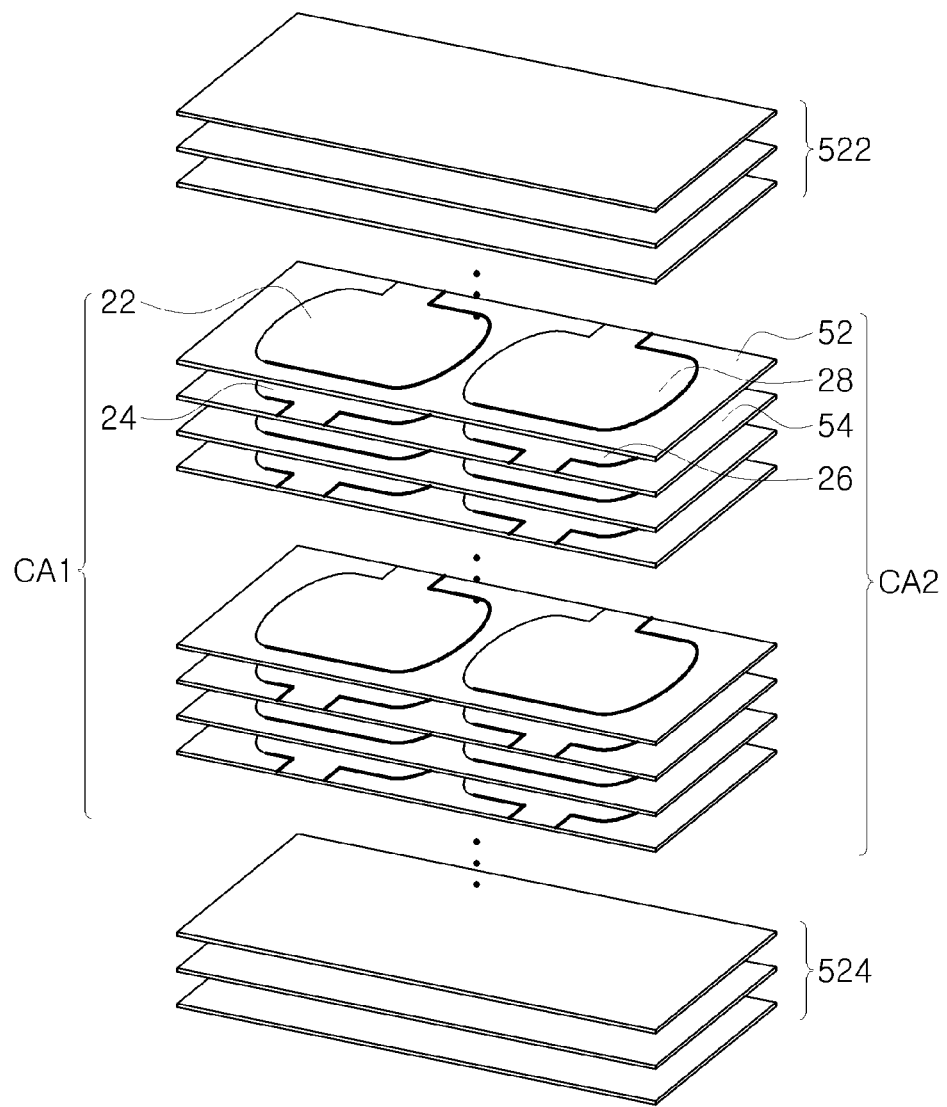
FIG. 4 is a schematic exploded perspective view of a laminated structure of internal electrodes formed on dielectric layers.

FIG. 1 is a partially cut-away perspective view of an array-type multilayer ceramic capacitor according to an embodiment of the present invention; FIG. 2 is a schematic cross-sectional view taken along line II-II of FIG. 1; FIG. 3 is a schematic cross-sectional view taken along line III-III of FIG. 1; and FIG. 4 is a schematic exploded perspective view of a laminated structure of internal electrodes formed on dielectric layers.

Referring to FIGS. 1 through 4, an array-type multilayer ceramic capacitor 10 according to an embodiment of the present invention may include a ceramic body 15, external electrodes 40, internal electrodes 20, and dielectric layers 50.

The ceramic body 15 may be manufactured by applying a conductive paste to ceramic green sheets to form internal electrodes 20 on the ceramic green sheets, and then laminating and sintering the ceramic green sheets on which the internal electrodes 20 are formed. Here, in order to embody the array-type multilayer ceramic capacitor 10, the internal electrodes 20 are arranged in parallel with one another at a gap (G) on a single dielectric layer 50. The conductive paste may be applied such that the internal electrodes 20 each have an outline O close to a quadrangular shape, and the internal electrodes 20 may be laminated.

The ceramic body 15 may be formed by repeatedly laminating a plurality of dielectric layers 50 and internal electrodes 22, 28, 24, and 26. The internal electrodes 22, 24, 26, and 28 may be disposed such that the internal electrodes 22 and 28 have a gap G on a common dielectric layer 52 and the internal electrodes 24 and 26 also have a gap G on a common dielectric layer 54.

The laminated internal electrodes 22 and 24 and other laminated internal electrodes 28 and 26 may be disposed at a gap G therebetween, so that they may be differentiated from one another. That is, two internal electrode lamination portions CA1 and CA2 may be formed based on the gap G in one ceramic body 15.

Here, CA1 and CA2 may be called a first internal electrode lamination portion and a second internal electrode lamination portion, respectively.

As such, the number of internal electrode lamination portions CA1 and CA2 is increased in one ceramic body 15, and thus, a plurality of capacitors connected in parallel in one ceramic body 15 may be realized.

Here, the ceramic body 15 having a miniaturized size may have 200 or more lamination layers of internal electrodes 22, 28, 24, and 26 formed on the dielectric layers 50 in order to increase capacitance.

The ceramic body 15 may have a hexahedral shape. An external appearance of the ceramic body 15 may not have a hexahedral shape with a complete straight line due to sintering shrinkage of ceramic powders, when the ceramic powders are sintered in a chip shape. However, the ceramic body 15 may have a substantially hexahedral shape.

Figure 7:
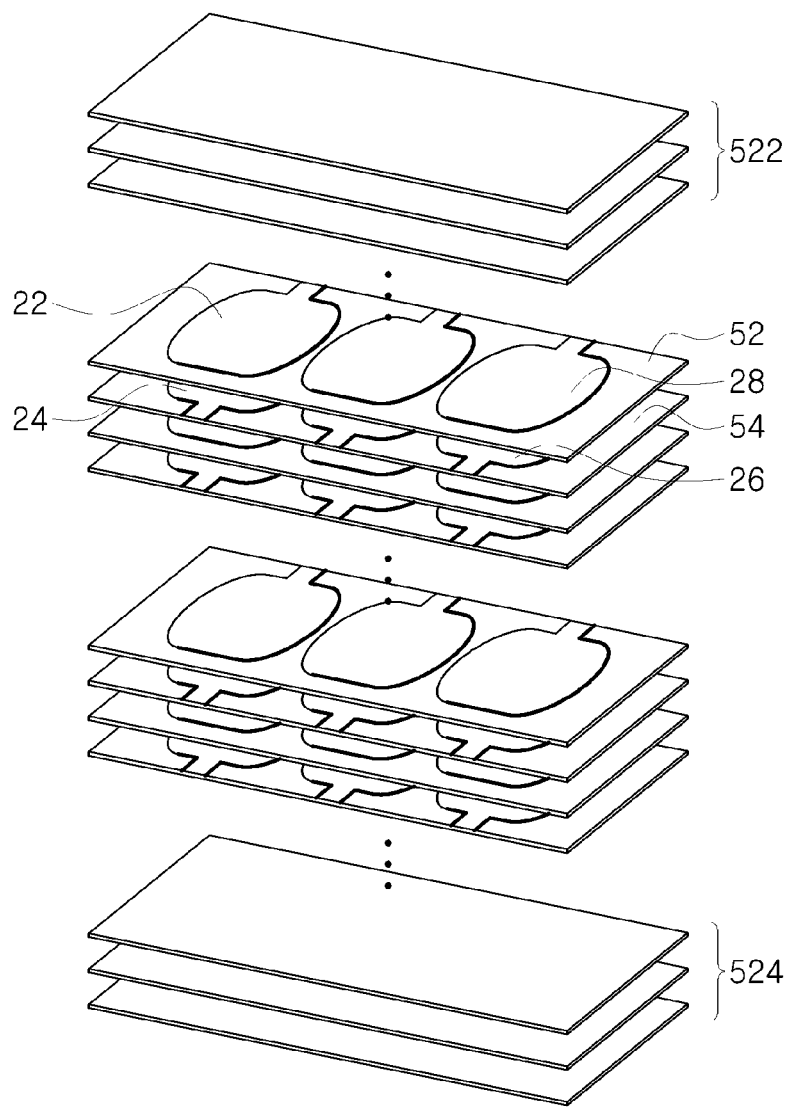
FIG. 7 is a schematic exploded perspective view of a laminated structure of a 6-terminal multilayer ceramic capacitor according to an embodiment of the present invention.
Figure 8:
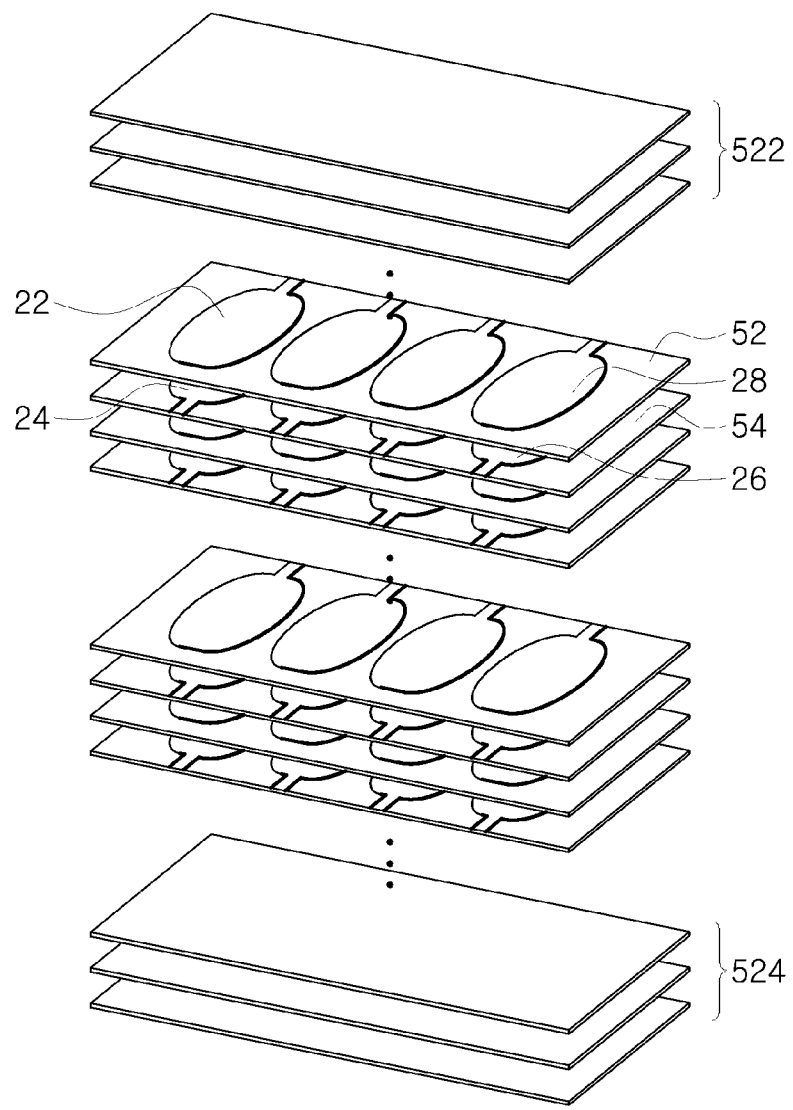
FIG. 8 is a schematic exploded perspective view of a laminated structure of an 8-terminal multilayer ceramic capacitor according to an embodiment of the present invention.

The external electrodes 40 face each other in a width direction of the ceramic body 15, and at least two external electrodes 40 may be formed on one side surface of the ceramic body 15. The number of external electrodes 40 is not particularly limited, and may be prepared for 4 terminals, 6 terminals, 8 terminals, or the like. FIGS. 7 and 8 show internal electrode lamination portions that are extensively applicable to the 6 terminals and 8 terminals.

Directions of the hexahedron will be defined in order to clearly describe the embodiment of the present invention. L, W and T directions, shown in FIG. 1, are defined as a length direction, a width direction, and a thickness direction, respectively. Here, the thickness direction T may be used to have the same meaning as the lamination direction of internal electrodes, in which the internal electrodes are laminated. In an embodiment of the present invention, the length direction L may be defined as a direction towards the ends of the hexahedron. In addition, the width direction W may be defined as a direction in which leads 222 and 242 of internal electrodes 22, 28, 24, and 26 are drawn out such that the internal electrodes 22, 28, 24, and 26 are electrically connected with the external electrodes 44, 48, 42, and 46.

The dielectric layers 50 and the internal electrodes 22, 24, 28, and 26 may be observed from a cross section of the sintered ceramic body 15 taken in length-thickness directions (L-T) as shown in FIG. 2 (hereinafter, referred to as an 'L-T cross-section') and a cross section of the ceramic body 15 taken in width-thickness (W-T) directions as shown in FIG. 3 (hereinafter, referred to as a 'W-T cross-section').

As a material forming the dielectric layers 50, a ceramic powder having a relatively high dielectric constant may be used for high capacitance. Examples of the ceramic powder may include a barium titanate ($BaTiO_3$) based power or a strontium titanate ($SrTiO_3$) based power, or the like, but are not limited thereto.

In the present embodiment, the dielectric layer 50 may have a thickness (td) of 0.7 μm or less.

Here, the thickness (td) of the ceramic layer 50 may refer to an average thickness of one ceramic layer 50 disposed between the internal electrodes 20.

The thickness of the dielectric layer 50 may be measured from an image obtained by scanning a cross section in a length direction of the ceramic body 15 using a scanning electron microscope (SEM), as shown in FIGS. 2 and 3. For example, the average thickness of the dielectric layer 50 may be obtained by measuring the thicknesses at 30 equidistant points in a length direction, on an image of any dielectric layer 50, extracted from the image obtained by scanning a cross section in length-thickness directions (L-T), cut in a central portion in a width direction (W) of the ceramic body 15, and then averaging the measured thickness values. The thicknesses at 30 equidistant points may be determined in a capacitance forming portion 60, an area in which the first and second internal electrodes 22 and 24 overlap one another. In addition, when this method for average measurement is extensively performed on 10 or more ceramic layers 50 and an average thereof is calculated, the thickness of the ceramic layer 50 may be more generalized.

In addition, the thickness (td) of the dielectric layer 50 may be measured from an image obtained by scanning a cross section in a width-thickness direction (W-T) at a central portion in the length direction, using a scanning electron microscope (SEM).

Here, the central portion in the width direction (W) or the length direction (L) of the ceramic body 15 may be defined as an area from a central point in the width direction W or the length direction L of the ceramic body 15 to a region within 30% of the width or the length of the ceramic body 15.

In the first internal electrode lamination portion CA1, the internal electrodes 20 may include the first internal electrodes 22 and second internal electrodes 24, and the first and second internal electrodes 22 and 24 may be electrically connected with the first and second external electrodes 42 and 44 through the leads 222 and 242, respectively.

That is, one internal electrode 22 of the internal electrodes that face one another with the dielectric layer 50 therebetween may include the lead 222 drawn out to one side surface Ls2 of the ceramic body 15, and the other internal electrode 24 may include the lead 242 drawn out to the other side surface Ls1.

The first and second external electrodes 42 and 44 may be formed of a conductive paste containing a metal powder. The metal powder contained in the conductive paste may be Cu, Ni, or an alloy thereof, but is not limited thereto.

Here, the first and second internal electrodes 22 and 24 may be alternately and repeatedly laminated while having the dielectric layer 50 interposed therebetween. An active area portion 60 is defined as portions of the internal electrodes 22 and 24, which overlap one another with the dielectric layer 50 interposed therebetween to thereby contribute to capacitance formation, on the L-T cross section of FIG. 2 and the W-T cross section of FIG. 3. The internal electrodes 22 and 24 may include the leads 222 and 242 connecting the active area portion 60 and the external electrodes 42 and 44 with one another, respectively. The lead 222 or 242 may have a length thereof in the width direction, shorter than a length of the active area portion 60 in the width direction.

As such, the shapes of the first and second internal electrodes 22 and 24 may be applied to the second internal electrode lamination portion CA2 in the same manner.

In addition, in the ceramic body 15, a margin portion M is defined as a portion of the dielectric layers 50, in which the internal electrodes 22 and 24 of the first internal electrode lamination portion CA1 and the internal electrodes 28 and 26 of the second internal electrode lamination portion CA2 are not formed. Here, upper and lower margin portions M of the active area portion in the thickness direction may be defined by upper and lower cover layers 522 and 524. In addition, the active area portion in which the internal electrodes 22 and are laminated with the dielectric layer interposed therebetween may be defined by an active layer as a counterpart concept of the upper and lower cover layers 522 and 524.

The plurality of dielectric layers 50 constituting the ceramic body 15 are in a sintered state. Hence, adjacent dielectric layers 50 may be integrated such that boundaries therebetween are difficult to differentiate from one another without using a scanning electron microscope (SEM).

Meanwhile, the multilayer ceramic capacitor 10 according to an embodiment of the present invention may be miniaturized to have a standard size, such as 1.37±0.15 mm and 1.0±0.15 mm (1410 size) or 0.9±0.05 mm and 0.6±0.05 mm (0906 size) in the length and width of the ceramic body 15.

In addition, for high capacitance, the number of internal electrodes 20 laminated inside the ceramic body 15 may be 200 or more.

It may be seen that, in this array-type multilayer ceramic capacitor 10, BDV characteristics thereof were deteriorated as shown in Table 1 below, as the dielectric layer became thicker and the number of dielectric layers became increased.

TABLE 1

| No. | Size | td (μm) | Number of Laminations (Layer) | BDV (V) |
|---|---|---|---|---|
| 1 | 0906 | 0.8 | 180 | 140 |
| 2 | | | 190 | 136 |
| 3 | | | 195 | 122 |
| 4 | | | 205 | 110 |
| 5 | | 0.7 | 180 | 97 |
| 6 | | | 190 | 84 |
| 7 | | | 195 | 63 |
| 8 | | | 205 | 34 |
| 9 | 1410 | 0.8 | 180 | 134 |
| 10 | | | 190 | 130 |
| 11 | | | 195 | 121 |
| 12 | | | 205 | 109 |
| 13 | | 0.7 | 180 | 96 |
| 14 | | | 190 | 87 |
| 15 | | | 195 | 65 |
| 16 | | | 205 | 31 |

Referring to Table 1, samples were manufactured by varying the thickness of the dielectric layer and the number of dielectric layers for the 0906-size and 1410-size array-type multilayer ceramic capacitor. Here, breakdown voltage (BDV) was measured by determining the voltage at the time of voltage breakdown through application of 5 kV of DC voltage based on a leakage current of 5 mA while a QuadTech Sentry 30 was used as a meter.

Referring to Table 1, in the 0906-sized and 1410-sized multilayer ceramic capacitors, as the thickness of the dielectric layer is decreased from 0.8 μm to 0.7 μm and the number of laminations is increased, BDV may be deteriorated to 100V or lower. Therefore, it may be seen that, as the thickness of the dielectric layer is decreased to 0.7 μm or less and the number of laminations is increased, another design for preventing the deterioration of BDV characteristics is necessary.

Figure 5:
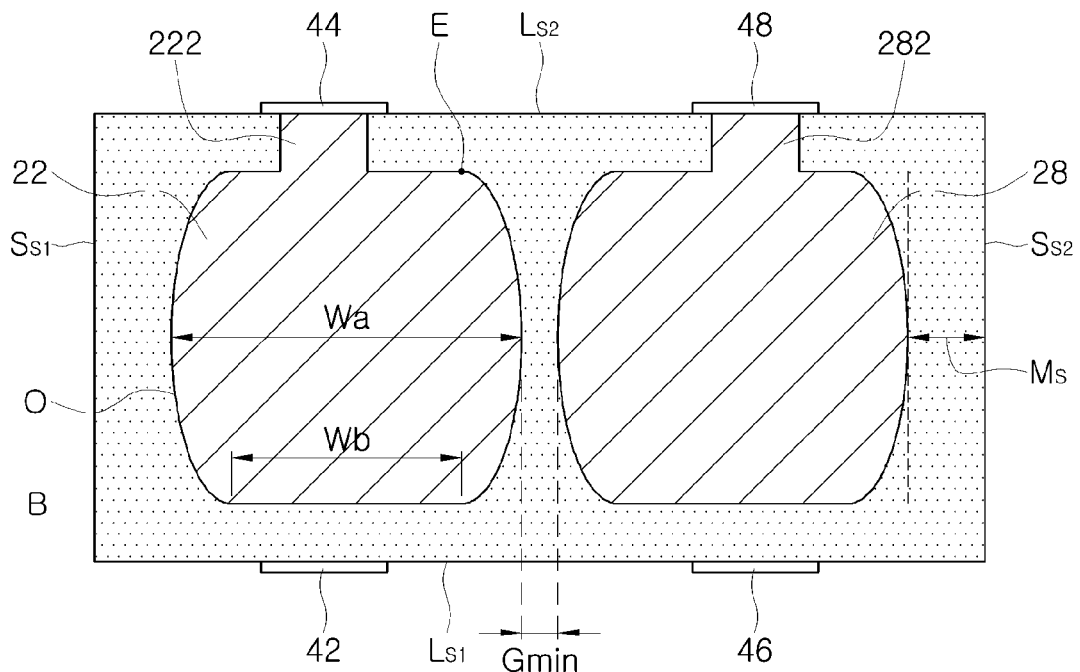
FIG. 5 is a plane view of the multilayer ceramic capacitor of FIG. 1 cut in length-width directions.
Figure 6:
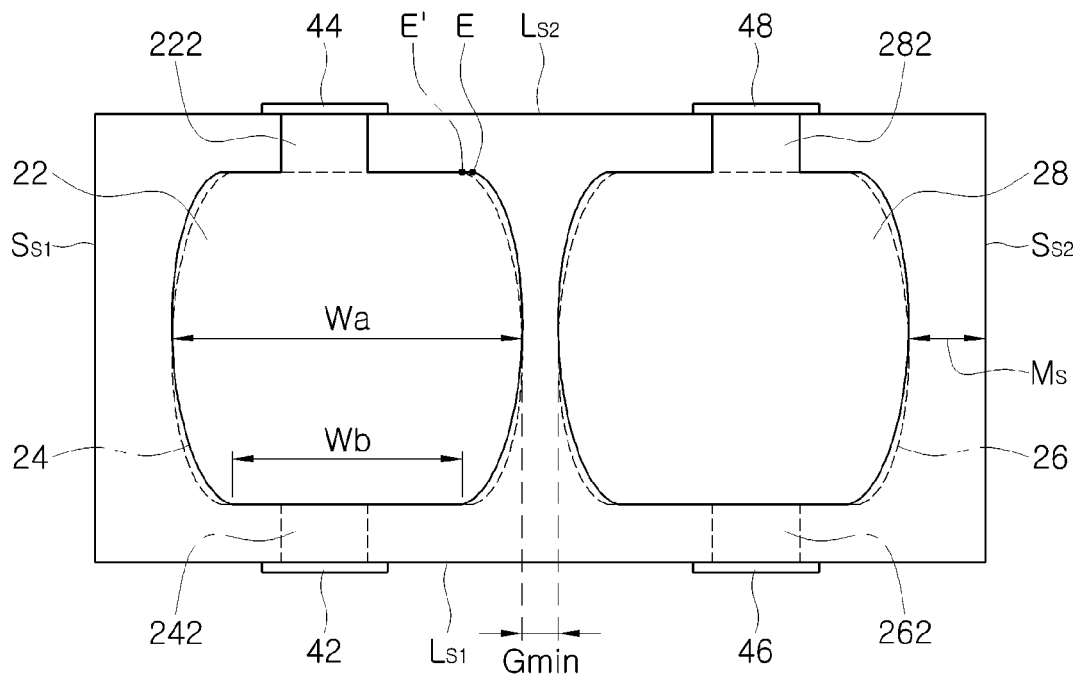
FIG. 6 is a plane view of a structure in which internal electrodes of an under layer are reflected on the dielectric layer by polishing the multilayer ceramic capacitor of FIG. 1 in length-width directions.

FIG. 5 is a plane view of the multilayer ceramic capacitor of FIG. 1 cut in length-width directions; and FIG. 6 is a plane view of a structure in which internal electrodes of an under layer are reflected on the dielectric layer by polishing the multilayer ceramic capacitor of FIG. 1 in length-width directions.

Improvement in electric field focusing according to the relationship between the gap between the internal electrodes and the curvatures of the internal electrode edges O of the internal electrodes according to an embodiment of the present invention will be described in detail with reference to FIGS. 5 and 6.

In the embodiment of the present invention, the adjacent internal electrode edges O of the internal electrodes may have a convex shape toward the center potion of the internal electrode. Here, when a narrowest gap between the adjacent internal electrode edges O is denoted by Gmin, 10 μm≤Gmin≤60 μm may be satisfied.

When Gmin is greater than 60 μm, the obtainable capacitance as compared with the target capacitance is decreased. When Gmin is less than 10 μm, short circuits may occur in a circuit in which the first internal electrode lamination portion and the second internal electrode lamination portion need to operate as capacitors, respectively.

That is, concentration of electric field may be improved by controlling the size of the gap G between the adjacent internal electrodes and the curvatures of the internal electrodes. As shown in FIG. 5, a widest width of the internal electrode may be denoted by Wa, a narrowest width of the internal electrode may be denoted by Wb, and the curvature of the internal electrode edges may be denoted by Wa/Wb.

Here, Wa may be the width of a central portion of the internal electrode 22, Wb may be the width of an end portion of the outline of the internal electrode 22. The central portion of the internal electrode may be defined as a region within the range of 30% of the internal electrode 22 except the lead 222, including a central point, in the length in a width direction of the ceramic body. In addition, the end line B of the outline may not be a straight line. In the case in which the end line B is curved, the bottom line B may be the length of a straight line, at a region within 5% of the internal electrode 22 except the lead 222, extended from the lower end thereof, in the length in a width direction of the ceramic body.

In the embodiment of the present invention, the curvature of the outline may satisfy 1.1≤Wa/Wb≤1.35.

When Wa/Wb is less than 1.1, BDV characteristics may be deteriorated. When Wa/Wb is greater than 1.35, the capacitance value may be decreased and short electrically conducting between the internal electrodes may occur.

In the embodiment of the present invention, when a margin portion between the internal electrode edge O of the internal electrode 28 and one end surface Ss2 of the ceramic body 15 adjacent thereto is denoted by Ms, Gmin≤Ms may be satisfied. When Gmin is greater than Ms, Ms is very narrow, and thus, in this case, moisture may permeate into the capacitor body 15, which may cause deterioration in moisture resistance.

FIG. 6 shows a structure in which the internal electrodes 24 and 26 of the under layer are reflected on the internal electrodes 22 and 28 of the above layer while the dielectric layer 52 is disposed between the internal electrodes. In the present embodiment, corner portions E and E' of the internal electrodes 22 and 28 of the above layer do not overlap one another, so that an overlapping of electric fields focusing on the internal electrodes may be prevented.

Meanwhile, in the array-type multilayer ceramic capacitor 10, the internal electrode edges O of the internal electrodes 22 and 28 of the above layer and the internal electrodes 24 and 26 of the under layer have a curvature, and thus, concentration of an electric field generated at the internal electrode edges O may be prevented.

Hereinafter, prevention of an electric field focusing according to the relationship between the size of the gap between the internal electrodes and the curvature of the outline of the internal electrode will be described in detail through experimental examples.

EXPERIMENTAL EXAMPLE

Hereinafter, embodiments of the present invention will be specifically described with reference to experimental data of the inventive examples and comparative examples of the present invention.

Tables 2 and 3 below show the change in obtainable capacitance as compared with the target capacitance, the change in BDV, and the like, depending on the changes in Gmin and Wa/Wb, in 0906-sized and 1410-sized array-type multilayer ceramic capacitors, when a narrowest gap between internal electrode edges of internal electrodes adjacent to one another on one dielectric layer is denoted by Gmin, a widest width of one internal electrode is denoted by Wa, a narrowest width of the internal electrode is denoted by Wb, and the curvature of the outline is denoted by Wa/Wb.

In the various chip sized multilayer ceramic capacitors used in experiments for obtaining the results of Tables 2 and 3, the number of laminations of inner electrodes ranged between 200 layers to 500 layers in order to realize high capacitance therein.

The multilayer ceramic capacitors according to the inventive examples and comparative examples of the present invention were manufactured as follows. A slurry including powders, such as barium titanate ($BaTiO_3$) and the like, was applied and dried on carrier films, to thereby prepare a plurality of ceramic green sheets. The ceramic green sheets became dielectric layers having an average thickness of 0.7 µm after sintering.

Then, a conductive paste for nickel inner electrode was applied to the ceramic green sheets by using a screen, such that patterns of inner electrodes were formed on the ceramic green sheets, to thereby form the inner electrodes. Here, in order to realize an array-type multilayer ceramic capacitor, the internal electrodes were formed such that the internal electrodes had a gap therebetween and internal electrode edges of the internal electrodes faced one another.

In addition, in order to realize the curvature of the outline of the internal electrode, the internal electrodes were formed such that the width of the internal electrode had a wider curvature toward the center portion thereof.

Here, 250 layers of the ceramic green sheets were laminated, and then this laminate was subjected to isostatic pressing at 85° C. under the pressure condition of 1000 kgf/cm². The pressing-completed ceramic laminate was cut into individual chips, and then the cut chips were subjected to debindering at 230° C. under an air atmosphere for 60 hours.

Thereafter, the resultant chips were subjected to firing in a reducing atmosphere under an oxygen partial pressure of $10^{-11}$ atm~$10^{-10}$ atm, lower than the equilibrium oxygen partial pressure of Ni/NiO, such that the inner electrodes were not oxidized at 1150° C. or lower.

Here, after the firing, the respective chips were processed to have a chip size of 0.9±0.15 mm×0.6±0.15 mm, that is, 0906 size.

Then, an external electrode forming process, a plating process, and the like were performed to manufacture multilayer ceramic capacitors.

TABLE 2

| | Size | td (µm) | Gmin (µm) | Wa/Wb | Capacitance as compared with Target Capacitance (%) | Short Circuits | BDV (V) |
|---|---|---|---|---|---|---|---|
| 1* | 0906 | 0.7 | 9 | 1.08 | | short | 31 |
| 2* | | | 9 | 1.11 | | short | 33 |
| 3* | | | 11 | 1.06 | 100 | | 34 |
| 4* | | | 11 | 1.09 | 99 | | 35 |
| 5 | | | 11 | 1.11 | 99 | | 53 |
| 6 | | | 11 | 1.25 | 98 | | 57 |
| 7 | | | 11 | 1.35 | 97 | | 56 |
| 8* | | | 11 | 1.36 | 97 | short | 58 |
| 9* | | | 11 | 1.41 | 96 | short | 59 |
| 10* | | | 15 | 1.06 | 96 | | 38 |

TABLE 2-continued

| | Size | td (µm) | Gmin (µm) | Wa/Wb | Capacitance as compared with Target Capacitance (%) | Short Circuits | BDV (V) |
|---|---|---|---|---|---|---|---|
| 11* | | | 15 | 1.09 | 96 | | 37 |
| 12 | | | 15 | 1.11 | 95 | | 48 |
| 13 | | | 15 | 1.25 | 95 | | 49 |
| 14 | | | 15 | 1.35 | 95 | | 49 |
| 15* | | | 15 | 1.36 | 95 | short | 50 |
| 16* | | | 15 | 1.41 | 95 | short | 51 |
| 17* | | | 58 | 1.07 | 95 | | 43 |
| 18* | | | 58 | 1.09 | 95 | | 45 |
| 19 | | | 58 | 1.11 | 94 | | 65 |
| 20 | | | 58 | 1.26 | 94 | | 63 |
| 21 | | | 58 | 1.35 | 93 | | 68 |
| 22* | | | 58 | 1.37 | 92 | short | 69 |
| 23* | | | 58 | 1.40 | 92 | short | 70 |
| 24* | | | 62 | 1.06 | 89 | | 54 |
| 25* | | | 62 | 1.09 | 88 | | 56 |
| 26* | | | 62 | 1.11 | 87 | | 74 |
| 27* | | | 62 | 1.31 | 85 | | 78 |
| 28* | | | 62 | 1.34 | 84 | | 80 |
| 29* | | | 62 | 1.36 | 83 | short | 81 |

*Comparative Example

TABLE 3

| | Size | td (µm) | Gmin (µm) | Wa/Wb | Capacitance as compared with Target Capacitance (%) | Short Circuits | BDV (V) |
|---|---|---|---|---|---|---|---|
| 1* | 1410 | 0.7 | 8 | 1.08 | | short | 34 |
| 2* | | | 8 | 1.11 | | short | 36 |
| 3* | | | 11 | 1.06 | 100 | | 37 |
| 4* | | | 11 | 1.09 | 99 | | 39 |
| 5 | | | 11 | 1.11 | 98 | | 58 |
| 6 | | | 11 | 1.25 | 98 | | 56 |
| 7 | | | 11 | 1.35 | 98 | | 55 |
| 8* | | | 11 | 1.36 | 98 | short | 57 |
| 9* | | | 11 | 1.41 | 97 | short | 58 |
| 10* | | | 31 | 1.06 | 97 | | 40 |
| 11* | | | 31 | 1.09 | 96 | | 41 |
| 12 | | | 31 | 1.11 | 96 | | 51 |
| 13 | | | 31 | 1.25 | 96 | | 52 |
| 14 | | | 31 | 1.35 | 96 | | 54 |
| 15* | | | 31 | 1.36 | 96 | short | 56 |
| 16* | | | 31 | 1.41 | 96 | short | 58 |
| 17* | | | 59 | 1.07 | 95 | | 43 |
| 18* | | | 59 | 1.09 | 95 | | 45 |
| 19 | | | 59 | 1.11 | 94 | | 72 |
| 20 | | | 59 | 1.26 | 94 | | 69 |
| 21 | | | 59 | 1.35 | 93 | | 75 |
| 22* | | | 59 | 1.37 | 92 | short | 76 |
| 23* | | | 59 | 1.40 | 92 | short | 77 |
| 24* | | | 61 | 1.06 | 89 | | 59 |
| 25* | | | 61 | 1.09 | 88 | | 62 |
| 26* | | | 61 | 1.11 | 87 | | 73 |
| 27* | | | 61 | 1.31 | 85 | | 77 |
| 28* | | | 61 | 1.34 | 84 | | 79 |
| 29* | | | 61 | 1.36 | 83 | short | 80 |

*Comparative Example

Table 2 and Table 3 show the measurement results of the 0906-size array-type multilayer ceramic capacitors and the 1410-size array-type multilayer ceramic capacitors, respectively, for the smallest gap (Gmin) between the internal electrode edges of the internal electrodes adjacent to one another, the obtainable capacitance as compared with the target capacitance depending on the curvature (Wa/Wb) between the widest width and the narrowest width of the internal electrode, BDV, and occurrence of short circuits.

In the present experiment, capacitance was measured by using a 4278 meter by Agilent Company in the condition of 1 kHz and 0.5 Vrms. In addition, breakdown voltage (BDV) was measured by determining the voltage at the time of breakdown through application of 5 kV of DC voltage based on a leakage current of 5 mA while QuadTech Sentry 30 was used as a meter.

Referring to Tables 2 and 3, in Samples 1 and 2 in Tables 2 and 3 having Gmin of less than 10 μm, BDV was very low, and short circuits occurred in the case that the first internal electrode lamination portion and the second internal electrode lamination portion need to operate as a capacitor, respectively. That is, electric conduction may occur between the adjacent internal electrodes on a single dielectric layer.

In Samples 24 to 29 of Tables 2 and 3 having Gmin of greater than 60 μm, the obtainable capacitance as compared with the target capacitance was decreased.

Meanwhile, on the assumption that Gmin satisfies 10 μm≤Gmin≤60 μm, in Samples 3, 4, 10, 11, 17, and 18 of Tables 2 and 3 having Wa/Wb of less than 1.1, BDV may be very low. In addition, in Samples 8, 9, 15, 16, 22, and 23 of Tables 2 and 3 having Wa/Wb of greater than 1.35, short circuits may occur and the capacitance value may be decreased.

Referring to experimental examples of Tables 2 and 3, in the case in which the thickness of the dielectric layer is set to 0.7 μm or less in 1410 size or smaller sizes, the gap between the internal electrodes on a single dielectric layer, the range of Gmin, and the curvature of the outline of the internal electrode, Wa/Wb, may be appropriately controlled, so that decrease in capacitance, occurrence of short circuits, and deterioration in BDV characteristics may be prevented.

As set forth above, in the multilayer ceramic electronic component according to embodiments of the present invention, electric field focusing worse between the internal electrodes disposed on the upper dielectric layer and the lower dielectric layer may be prevented and BDV characteristics may be improved while the array-type multilayer ceramic capacitor is miniaturized and has high capacitance.

Further, since a narrowest portion of the gap between the internal electrodes adjacent to one another on the dielectric layer has a curvature, electric field focusing occurring between the internal electrodes disposed on a single dielectric layer may be prevented and BDV characteristics may be improved.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component, comprising:
    a ceramic body including dielectric layers;
    external electrodes formed on external surfaces of the ceramic body; and
    two internal electrodes adjacent to each other with a gap therebetween on a single dielectric layer, each of the two internal electrodes having a first convex-shape side adjacent to the other internal electrode and a second convex-shape side opposite to the first convex-shape side and two flat-shape sides connecting the two convex-shape side,
    wherein the gap between the first convex-shape of the two internal electrodes becomes narrower toward a central portion of the first convex-shape from the end of the first convex-shape side.

2. The multilayer ceramic electronic component of claim 1, wherein each of the dielectric layers has an average thickness of 0.7 μm or less.

3. The multilayer ceramic electronic component of claim 1, wherein a narrowest gap between the convex-shape sides of the internal electrodes adjacent to one another is denoted by Gmin, 10 μm≤Gmin≤60 μm.

4. The multilayer ceramic electronic component of claim 1, wherein, when a width of the central portion of the internal electrode is denoted by Wa, and a width of an end portion of an outline of the internal electrode is denoted by Wb, 1.1≤Wa/Wb≤1.35 is satisfied.

5. The multilayer ceramic electronic component of claim 4, wherein Wa is a widest width of the internal electrode and Wb is a narrowest width of the internal electrode.

6. The multilayer ceramic electronic component of claim 1, wherein, when a margin portion between the convex-shape sides of the internal electrodes and one end surface of the ceramic body adjacent thereto is denoted by Ms, Gmin≤Ms is satisfied.

7. The multilayer ceramic electronic component of claim 1, wherein, between the internal electrodes having the dielectric layer therebetween and facing one another in a lamination direction thereof, one internal electrode includes a lead drawn out to one side surface of the ceramic body and the other internal electrode includes a lead drawn out to the other side surface of the ceramic body.

8. The multilayer ceramic electronic component of claim 1, wherein the ceramic body has a length and a width of 1.37±0.15 mm and 1.0±0.15 mm, or 0.9±0.15 mm and 0.6±0.15 mm, respectively.

9. The multilayer ceramic electronic component of claim 1, wherein the internal electrodes having the dielectric layer therebetween and facing one another in a lamination direction thereof have corner portions which do not overlap one another.

10. A multilayer ceramic electronic component, comprising:
    a ceramic body including dielectric layers;
    external electrodes formed on external surfaces of the ceramic body; and
    two internal electrodes adjacent to each other with a gap therebetween on a single dielectric layer, each of the two internal electrodes having a first convex-shape side adjacent to the other internal electrode and a second convex-shape side opposite to the first convex-shape side and two flat-shape sides connecting the two convex-shape sides,
    wherein each of the two internal electrodes has a lead extending from an area of one of the two flat-shape sides to the external electrodes, the area of one of the flat-shape sides is off the center of one of the two flat-shape sides.

11. A multilayer ceramic electronic component, comprising:
    a ceramic body including dielectric layers;
    external electrodes formed on external surfaces of the ceramic body; and
    two internal electrodes adjacent to each other with a gap therebetween on a single dielectric layer, each of the two internal electrodes having a first convex-shape side adjacent to the other internal electrode and a second convex-shape side opposite to the first convex-shape side and two flat-shape sides connecting the two convex-shape sides,
    wherein each of the two internal electrodes has a lead extending from an area of one of the two flat-shape sides to the external electrodes, the area of one of the flat-shape sides is closer to the second convex-shape side than the first convex-shape side.

\* \* \* \* \*